(12) United States Patent
Shapiro

(10) Patent No.: US 7,082,692 B2
(45) Date of Patent: Aug. 1, 2006

(54) ADJUSTABLE MULTIFUNCTION RULER

(75) Inventor: David Shapiro, Chicago, IL (US)

(73) Assignee: It's Academic, Inc., Northbrook, IL (US)

( * ) Notice: Subject to any disclaimer, the term of this patent is extended or adjusted under 35 U.S.C. 154(b) by 0 days.

(21) Appl. No.: 10/982,738

(22) Filed: Nov. 4, 2004

(65) Prior Publication Data

US 2006/0090360 A1 May 4, 2006

(51) Int. Cl.
*B43L 7/10* (2006.01)

(52) U.S. Cl. .............................. 33/473; 33/464; 33/465

(58) Field of Classification Search ................. 33/473, 33/471, 472, 452, 454, 464, 465
See application file for complete search history.

(56) References Cited

U.S. PATENT DOCUMENTS

| 380,360 | A | * | 4/1888 | Spencer et al. | 33/43 |
|---|---|---|---|---|---|
| 842,205 | A | * | 1/1907 | Kelly | 33/473 |
| 1,183,977 | A | * | 5/1916 | Hoefle | 33/464 |
| 1,636,637 | A | * | 7/1927 | Setzer | 33/454 |
| 2,529,939 | A | * | 11/1950 | Higgins | 33/472 |
| 2,658,278 | A | * | 11/1953 | Debs | 33/473 |
| 2,770,043 | A | * | 11/1956 | Kwiecinski | 33/452 |
| 3,153,859 | A | * | 10/1964 | Jones | 33/419 |
| 3,218,720 | A | * | 11/1965 | Curry | 33/558.02 |
| 4,451,993 | A | * | 6/1984 | Yauk | 33/472 |
| 4,525,933 | A | * | 7/1985 | Patterson | 33/470 |
| 4,882,846 | A | * | 11/1989 | Reed | 33/464 |
| 4,920,658 | A | * | 5/1990 | Hile | 33/499 |
| 5,440,818 | A | * | 8/1995 | Mailhot | 33/452 |
| 6,134,797 | A | * | 10/2000 | Boyce | 33/464 |
| 6,467,179 | B1 | * | 10/2002 | Wolf | 33/474 |
| 6,944,962 | B1 | * | 9/2005 | Tessel et al. | 33/414 |

FOREIGN PATENT DOCUMENTS

GB  2258532 A  *  2/1993

* cited by examiner

*Primary Examiner*—Diego Gutierrez
*Assistant Examiner*—Amy R. Cohen
(74) *Attorney, Agent, or Firm*—Wood, Phillips, Katz, Clark & Mortimer

(57) ABSTRACT

An adjustable ruler includes two elongate ruler members and an adjustable clamping member. Each of the ruler members includes a longitudinal slot, outwardly facing channels along opposite sides of the slot, parallel longitudinal sides, and measuring indicia marked along the parallel longitudinal sides. The adjustable clamping member is received in each of the slots and includes first and second slide members and a selectively releasable connection between the first and second slide members. The slide members have parallel longitudinally extending flanges along opposite sides slidably secured in the channels of an associated ruler member. The releasable connection selectively permits relative pivoting of the slide members about a pivot axis, and includes a biasing member biasing the slide members apart, a threaded screw through the slide members, and a head threaded on an end of the screw to selectively secure the slide members together.

8 Claims, 3 Drawing Sheets

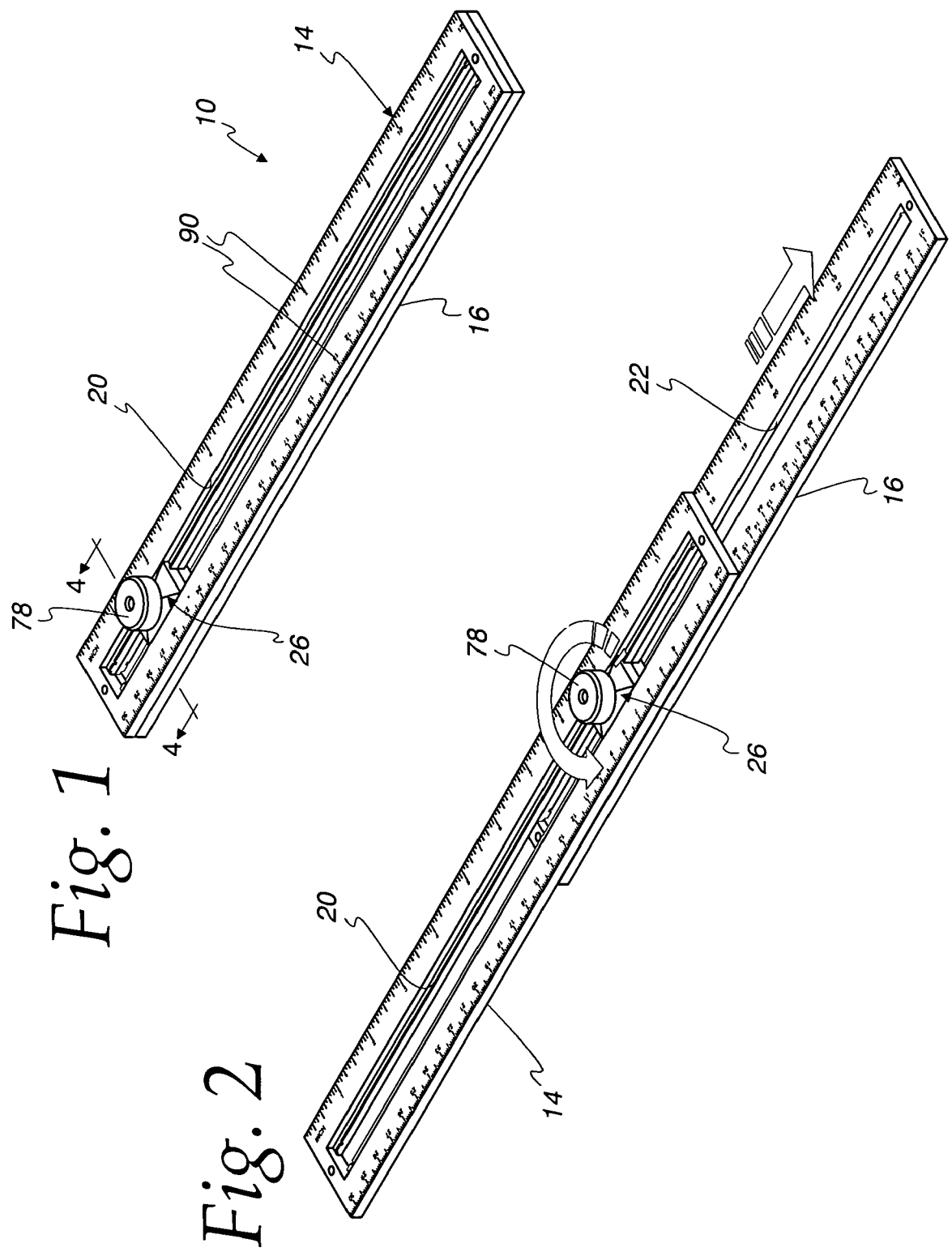

ADJUSTABLE MULTIFUNCTION RULER

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward rulers, and particularly toward compact adjustable multifunction rulers.

BACKGROUND OF THE INVENTION AND TECHNICAL PROBLEMS POSED BY THE PRIOR ART

Rulers, including adjustable rulers, are known in the art. Rulers which may be pivoted between a zig-zag compact position and a longitudinal extended position, for example, have been available for decades.

Moreover, rulers have been used for a variety of purposes in addition to measuring distances. For example, rulers are commonly used to provide straight edges either for drawing a straight line, or to provide a visual guide to follow across a row of written information.

The present invention is directed toward further improving upon rulers so as to provide still further functional and structural advantages.

SUMMARY OF THE INVENTION

In one aspect of the present invention, an adjustable ruler is provided, including first and second elongate ruler members, each of the ruler members including a slot with parallel longitudinal sides and measuring indicia marked therealong, and an adjustable clamping member received in each of the slots. The clamping member includes a first slide member slidably secured in the slot of the first ruler member, a second slide member slidably secured in the slot of the second ruler member, and a selectively releasable connection between the first and second slide members, the connection adapted to selectively permit relative pivoting of the slide members about a pivot axis. The first and second slide members have parallel longitudinal opposite sides engagable with the slot sides.

In one form of this aspect of the present invention, the ruler member slots each include channels along the parallel longitudinal sides, and the slide members include flanges along the opposite sides received in the channels. In a further form, the channels of the first slide member are open in a direction opposite the channels of the second slide member and the flanges of one slide member project toward the flanges of the other slide member.

In another form of this aspect of the present invention, the first and second ruler members have facing sides, each of the sides substantially lying in parallel planes, and the first and second slide members have facing sides which do not extend beyond the parallel planes toward one another.

In still another form of this aspect of the present invention, a biasing member biases the first and second slide members apart in the direction of the pivot axis, and the releasable connection is adapted to selectively hold the slide members together. In a further form, the clamping connector includes a threaded screw through the slide members with one end of the screw being seated in one of the slide members and the other end of the screw being threaded and extending beyond the other of the slide members, and a head threaded on the screw other end. The biasing member biases the other of the slide members against the head.

In yet another form of this aspect of the present invention, the releasable connection is adapted to selectively secure the first and second ruler members together in frictional engagement maintaining the first and second ruler members in selected positions relative to one another.

In another form of this aspect of the present invention, the measuring indicia include continuous indicia on the second ruler member whereby the indicia on the first and second ruler members define a continuous scale when the first and second ruler members are extended relative to one another.

In still another form of this aspect of the present invention, the measuring indicia include alignment indicia for positioning the first and second ruler members at specified angles to one another.

In yet another form of this aspect of the present invention, the slots define viewing guides for columns and rows with the ruler members oriented at a right angle relative to one another.

In another form of this aspect of the present invention, when the slide members engage an end of the associated ruler member slot, the pivot axis is spaced from the associated ruler member end a distance substantially equal to the distance between the pivot axis and the longitudinal sides of the other ruler member.

In another aspect of the present invention, an adjustable ruler is provided, including first and second elongate ruler members and an adjustable clamping member. Each of the ruler members includes a longitudinal slot, outwardly facing channels along opposite sides of the slot, parallel longitudinal sides, and measuring indicia marked along the parallel longitudinal sides. The slots define viewing guides for columns and rows with the ruler members oriented at a right angle relative to one another. The adjustable clamping member is received in each of the slots and includes first and second slide members and a selectively releasable connection between the first and second slide members. The first slide member has parallel longitudinally extending flanges along opposite sides slidably secured in the channels of the first ruler member, and the second slide member has parallel longitudinally extending flanges along opposite sides slidably secured in the channels of the second ruler member. The selectively releasable connection is adapted to selectively permit relative pivoting of the slide members about a pivot axis, and includes a biasing member biasing the first and second slide members apart in the direction of the pivot axis, a threaded screw through the slide members with one end of the screw being seated in one of the slide members and the other end of the screw being threaded and extending beyond the other of the slide members, and a head threaded on the screw other end. The biasing member biases the other of the slide members against the head. The releasable connection is adapted to selectively secure the first and second ruler members together in frictional engagement maintaining the first and second ruler members in a selected position relative to one another.

BRIEF DESCRIPTION OF THE DRAWINGS

FIG. 1 is a perspective view of a ruler embodying the present invention, in its compact condition;

FIG. 2 is a perspective view of the FIG. 1 ruler, in an extended condition;

DETAILED DESCRIPTION OF THE INVENTION

Figure 3:
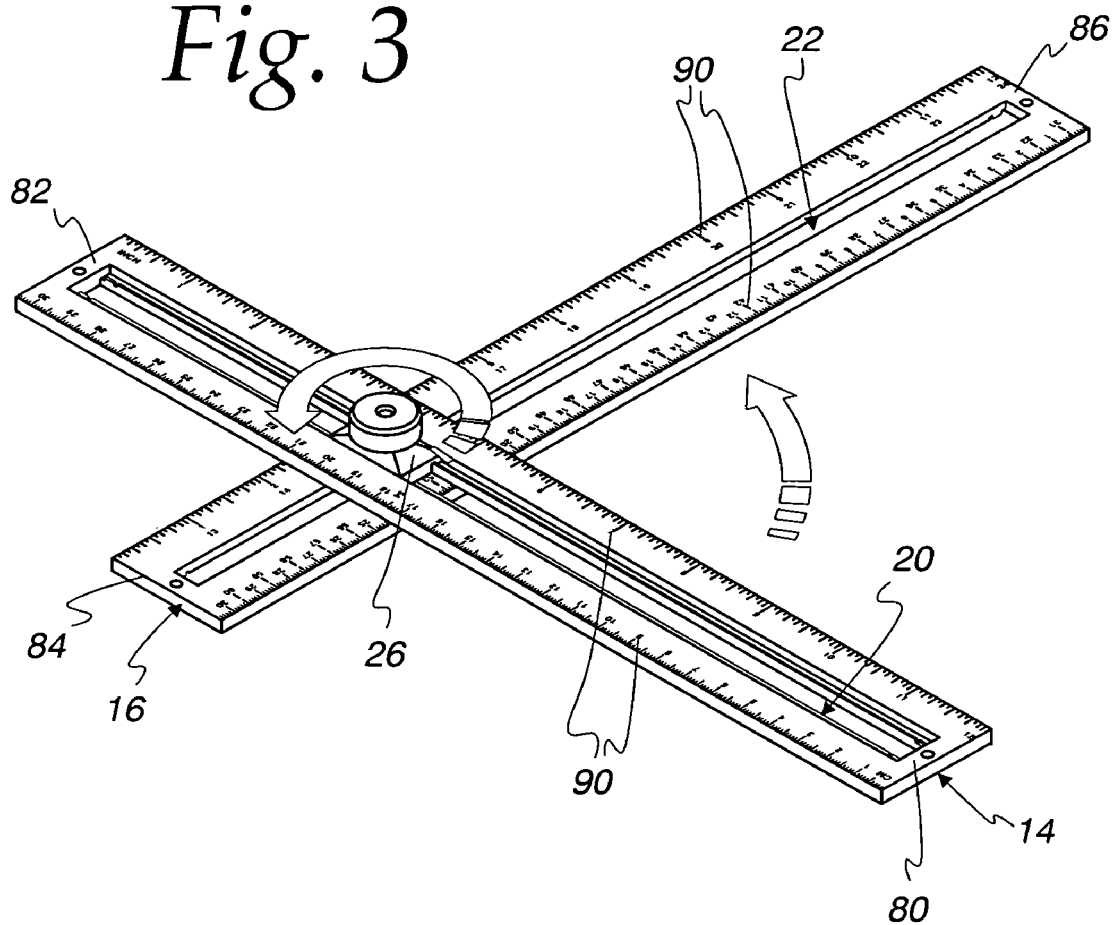
FIG. 3 is a perspective view of the FIG. 1 ruler, in a non-linear crossed condition

FIGS. 1 and 2 illustrate a ruler 10 according to the present invention, consisting of a pair of ruler members 14, 16, each having slots 20, 22 therein, and a selectively releasable and pivotable connector 26.

The ruler members 14, 16 each include sides 30, 32 facing one another (i.e., the lower side 30 of the upper ruler member 14 and the upper side 32 of the lower ruler member 16). Further, each of the slots 20, 22 may advantageously include outwardly facing channels 36, 38 extending longitudinally along each side of the slot 20, 22, which channels 36, 38 serve as guides for the connector 26 as described below.

The connector 26 includes an upper and lower clamping slide member 40, 42, each having longitudinally extending opposite sides along which parallel flanges 46, 48 are disposed. The flanges 46, 48 are received in the channels 36, 38 of associated ruler members 14, 16 whereby the clamping members 40, 42 may selectively slide relative to the associated ruler member 14, 16 but will not pivot relative thereto.

The connector 26 further includes a selectively releasable connection between the clamping members 40, 42, and is adapted to selectively permit relative pivoting of the slide members 40, 42 about a pivot axis 50 defined by a threaded screw 60 extending through aligned openings 52, 54 in the slide members 40, 42. The head 62 of the screw 60 seats in a recess 64 in the lower slide member 42, with both the head 62 and recess 64 preferably being non-cylindrical so that the screw 60 cannot pivot along its axis 50 relative to the slide member 42 when the head 62 is in the recess 64.

A compression spring 70 is disposed between the slide members 40, 42 to bias them apart. On end of the spring 70 may seat on one slide member 40, and the other may be received in an enlarged opening portion 72 in the other slide member 40 to trap the spring 70 and prevent undesirable binding or twisting.

Figure 4:
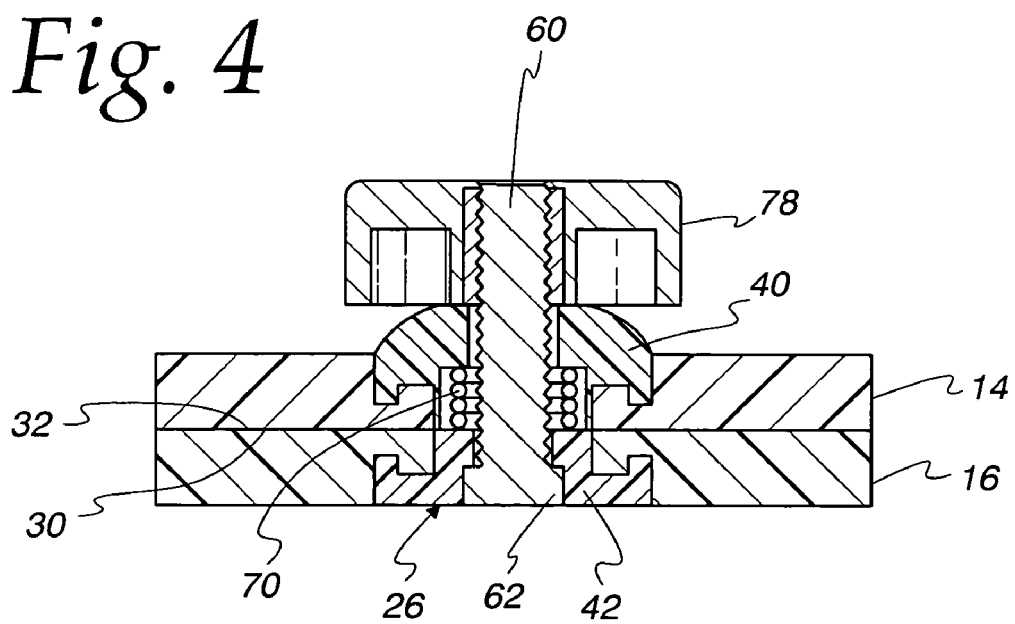
FIG. 4 is a cross-sectional view taken along line 4—4 of FIG. 1.
Figure 5:
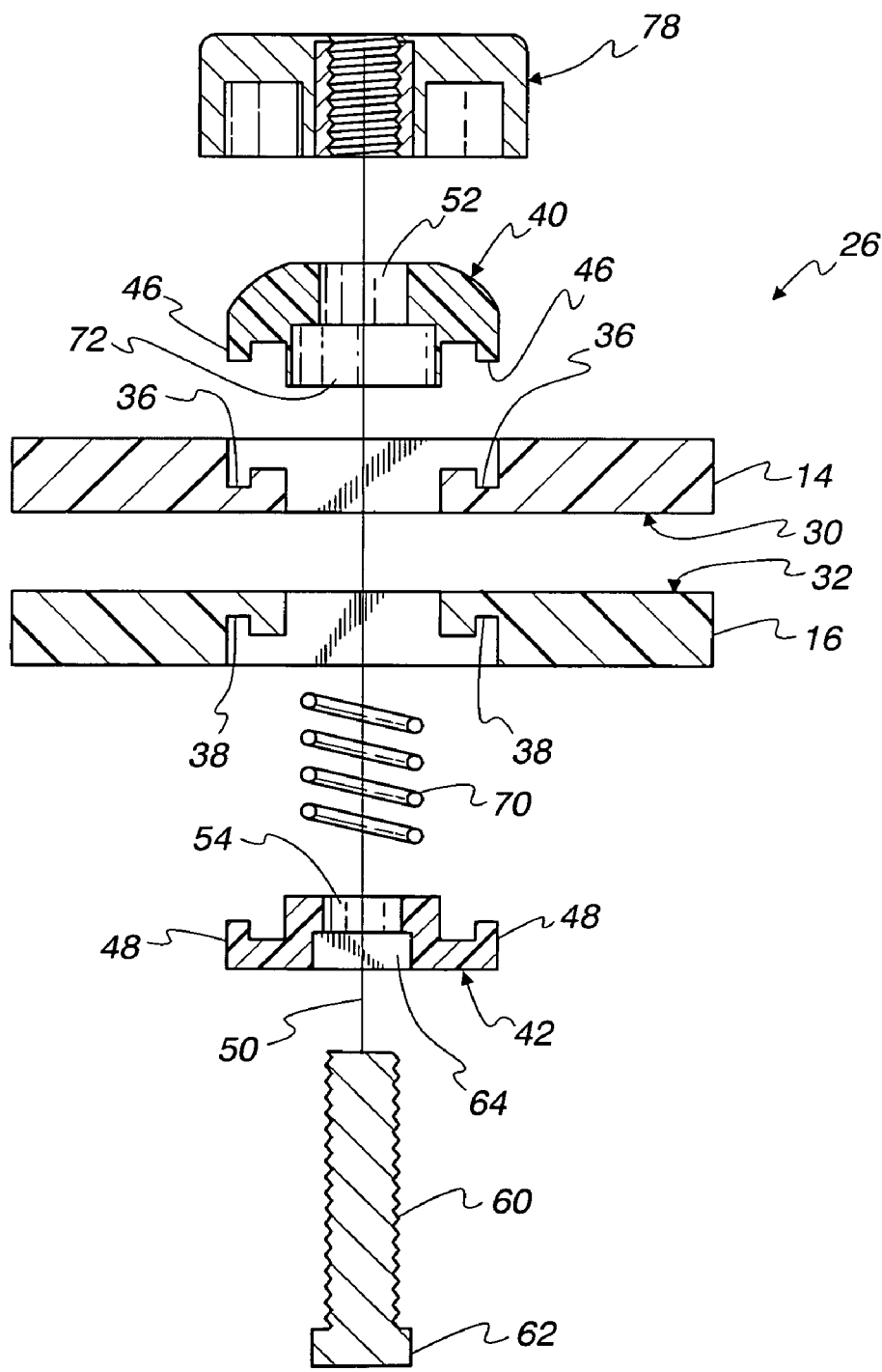
FIG. 5 is an exploded view of the connection illustrated in FIG. 4.

A nut head or knob 78 is screwed onto the upper end of the screw 60, whereby the entire assembly is held together as illustrated in FIG. 4. Moreover, it should be appreciated that by selective turning of the knob 78, the slide members 40, 42 may be tightened together against the biasing force of the spring 70, or released whereby the biasing force of the spring 70 may separate the slide members 40, 42.

Further, the facing sides of the slide members 40, 42 advantageously do not extend beyond the facing sides 30, 32 of the associated ruler members 14, 16, whereby the ruler members 14, 16 may be pivoted by sliding along their facing sides 30, 32 without interference by the slide members 40, 42.

It should thus be appreciated that the connector 26 may be used to selectively secure the ruler members 40, 42 together in frictional engagement to maintain the ruler members 40, 42 in selected positions relative to one another. Further, when the connector 26 is loosened so that the spring 70 will separate the slide members 40, 42, the ruler members 40, 42 will be released by a relaxing of the frictional forces between them, allowing them to be moved relative to one another by pivoting around the axis 50 and/or slid longitudinally relative to the connector 26.

In one advantageous configuration, the slide members 40, 42 and connecting slot ends 80, 82, 84, 86 of the associated ruler members 14, 16 may be sized so that, when the ruler members 14, 16 are fully extended (with the slide members 40, 42 engaging both ends [e.g., 80 and 84 or 82 and 86]), the pivot axis 50 is spaced from the associated ruler member ends a distance substantially equal to the distance between the pivot axis and the longitudinal sides of the other ruler member. With such a configuration, it should be appreciated that the ruler 10 may be arranged in a "T" configuration with the cross-member defined by a ruler member 14 or 16 which is aligned with the end surface of the other ruler member 16 or 14, thereby enabling ready alignment of the ruler members 14, 16 at a 90° orientation as desired in such configuration.

Measuring indicia 90 such as inch and centimeter scales, may be advantageously marked along opposite sides of the ruler members 14, 16. Moreover, the indicia 90 of one of the ruler members (e.g., ruler member 16) may include numeric indicia which are additive so that, when the ruler members 14, 16 are extended, a continuous scale of measurement is provided. For example, with twelve inch ruler members 14, 16 in which a one inch overlap is provided when the ruler members are fully extended, the lower ruler member 16 may include numeric indicia beginning with "13" at its two inch indicia, running to "23" at its twelve inch indicia. It should be appreciated, however, that such continuous indicia can be provided to be manually aligned at positions of less than full extension. It should also be appreciated that different overlaps of full extension between different ends could also be provided, if desired, with the overlap at one end being selected to provide ready alignment of the inches indicia along one side and the overlap at the other end being selected to provide ready alignment of the centimeter scale along the other side.

Indicia may also be provided to assist in aligning the ruler members 14, 16 at selected angles to facilitate use in drafting. For example, pairs of coordinated (e.g., by color) marks could be provided on opposite sides of the bottom ruler member 16 whereby aligning the top ruler member 14 with those marks would selectively position the ruler members 14, 16 at, for example, 30°, 45°, 60° and 90° orientations relative to one another.

It should also be appreciated that the slots 20, 22 may be used as visual guides. For example, with the ruler members 14, 16 oriented at right angles, the ruler 10 may be advantageously positioned on a spreadsheet whereby a column of the spreadsheet could be viewed through the slot 20 of one ruler member 14 and a row of the spreadsheet could be viewed through the slot 22 of the other ruler member 16. The connector 26 may be loosened during such use to allow one ruler member 14, 16 or the other to be slid to a different column or row while the other ruler member 16, 14 is held anchored at a base row or column. Of course, it should be appreciated that similar use could be accomplished using the sides of the ruler members 14, 16 as visual guides.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. An adjustable ruler, comprising:
   first and second elongate ruler members, each of said ruler members including a slot with parallel longitudinal sides and channels along said parallel longitudinal sides and measuring indicia marked therealong, and said first ruler member being movable relative to said second ruler member;
   an adjustable clamping member received in each of said slots, said clamping member including
      a first slide member slidably secured in said slot of said first ruler member,
      a second slide member slidably secured in said slot of said second ruler member,
      said first and second slide members each engagable with said slot sides,
      a selectively releasable connection between said first and second slide members, said connection adapted to selectively permit relative pivoting of said slide members about a pivot axis and to selectively hold said slide members together, and
      a biasing member biasing said first and second slide members apart in the direction of the pivot axis;
   wherein said releasable connection is adapted to selectively secure said first and second ruler members together in frictional engagement maintaining said first and second ruler members in selected positions relative to one another;
   wherein said channels of said first ruler member are open in a direction opposite said channels of said second ruler member and said flanges of one slide member project toward said flanges of said other slide member.

2. The adjustable ruler of claim 1, wherein said first and second ruler members have facing sides, each of said sides substantially lying in parallel planes, and said first and second slide members have facing sides which do not extend beyond said parallel planes toward one another.

3. The adjustable ruler of claim 1, wherein said clamping connector comprises
   a threaded screw through said slide members with one end of the screw being seated in one of said slide members and the other end of the screw being threaded and extending beyond the other of said slide members; and
   a head threaded on the screw other end, said biasing member biasing said other of said slide members against said head.

4. The adjustable ruler of claim 1, wherein said measuring indicia include continuous indicia on said second ruler member whereby said indicia on said first and second ruler members define a continuous scale when said first and second ruler members are extended relative to one another.

5. The adjustable ruler of claim 1, wherein said measuring indicia include alignment indicia for positioning said first and second ruler members at specified angles to one another.

6. The adjustable ruler of claim 1, wherein said slots define viewing guides for columns and rows with said ruler members oriented at a right angle relative to one another.

7. The adjustable ruler of claim 1, wherein when said slide members engage an end of the associated ruler member slot, said pivot axis is spaced from said associated ruler member end a distance substantially equal to the distance between the pivot axis and the longitudinal sides of the other ruler member.

8. An adjustable ruler, comprising:
   first and second elongate ruler members, each of said ruler members including
      a longitudinal slot,
      outwardly facing channels along opposite sides of said slot,
      parallel longitudinal sides, and
      measuring indicia marked along said parallel longitudinal sides,
      wherein said slots define viewing guides for columns and rows with said ruler members oriented at a right angle relative to one another;
   an adjustable clamping member received in each of said slots, said clamping member including
      a first slide member having parallel longitudinally extending flanges along opposite sides slidably secured in said channels of said first ruler member,
      a second slide member having parallel longitudinally extending flanges along opposite sides slidably secured in said channels of said second ruler member, and
      a selectively releasable connection between said first and second slide members, said connection adapted to selectively permit relative pivoting of said slide members about a pivot axis, and including
         a biasing member biasing said first and second slide members apart in the direction of the pivot axis,
         a threaded screw through said slide members with one end of the screw being seated in one of said slide members and the other end of the screw being threaded and extending beyond the other of said slide members; and
         a head threaded on the screw other end, said biasing member biasing said other of said slide members against said head,
      wherein said releasable connection is adapted to selectively secure said first and second ruler members together in frictional engagement maintaining said first and second ruler members in a selected position relative to one another;
   wherein said channels of said first ruler member are open in a direction opposite said channels of said second ruler member and said flanges of one slide member project toward said flanges of said other slide member.

* * * * *

UNITED STATES PATENT AND TRADEMARK OFFICE
CERTIFICATE OF CORRECTION

PATENT NO. : 7,082,692 B2  Page 1 of 1
APPLICATION NO. : 10/982738
DATED : August 1, 2006
INVENTOR(S) : David Shapiro It is certified that error appears in the above-identified patent and that said Letters Patent is hereby corrected as shown below:

Column 5, lines 18 and 29 should read as follows:

--said first and second slide members each having parallel longitudinal opposite sides with flanges along said opposite sides received in said channels and--

Signed and Sealed this

Fourteenth Day of August, 2007

JON W. DUDAS
*Director of the United States Patent and Trademark Office*